United States Patent [19]

Ogawa et al.

[11] Patent Number: 5,673,067
[45] Date of Patent: Sep. 30, 1997

[54] INFORMATION PROCESSING APPARATUS AND METHOD

[75] Inventors: Yasuyuki Ogawa, Kawasaki; Tsuneaki Kadosawa, Kanagawa-ken; Takashi Nakamura, Hiratsuka; Hitoshi Watanabe, Yokohama; Satoshi Asada, Inagi, all of Japan

[73] Assignee: Canon Kabushiki Kaisha, Tokyo, Japan

[21] Appl. No.: 783,359

[22] Filed: Jan. 16, 1997

Related U.S. Application Data

[63] Continuation of Ser. No. 354,465, Dec. 12, 1994, abandoned.

[30] Foreign Application Priority Data

Dec. 10, 1993 [JP] Japan .................................. 5-310501
Dec. 7, 1994 [JP] Japan .................................. 6-303743

[51] Int. Cl.[6] .................................................. G09G 5/08
[52] U.S. Cl. ........................... 345/157; 345/121; 345/162
[58] Field of Search .............................. 345/121, 123, 345/145, 146, 156, 157, 160, 162, 173; 395/133, 146, 147

[56] References Cited

U.S. PATENT DOCUMENTS 4,779,080  10/1988  Coughlin et al. .................... 345/157
5,287,439  2/1994   Koga et al. ........................... 395/133

*Primary Examiner*—Regina D. Liang
*Attorney, Agent, or Firm*—Fitzpatrick, Cella, Harper & Scinto

[57] ABSTRACT

An information processor includes a coordinate analyzer which analyzes input coordinate information, and a marking device which marks a desired coordinate. A memory stores marking coordinate information analyzed by the coordinate analyzer, and includes a mark name marked by the marking device. A display device displays the marking position in a display area based on marking information stored in the memory by designating the mark name when the marked coordinate is not present in the display area, when changing the display area.

16 Claims, 5 Drawing Sheets

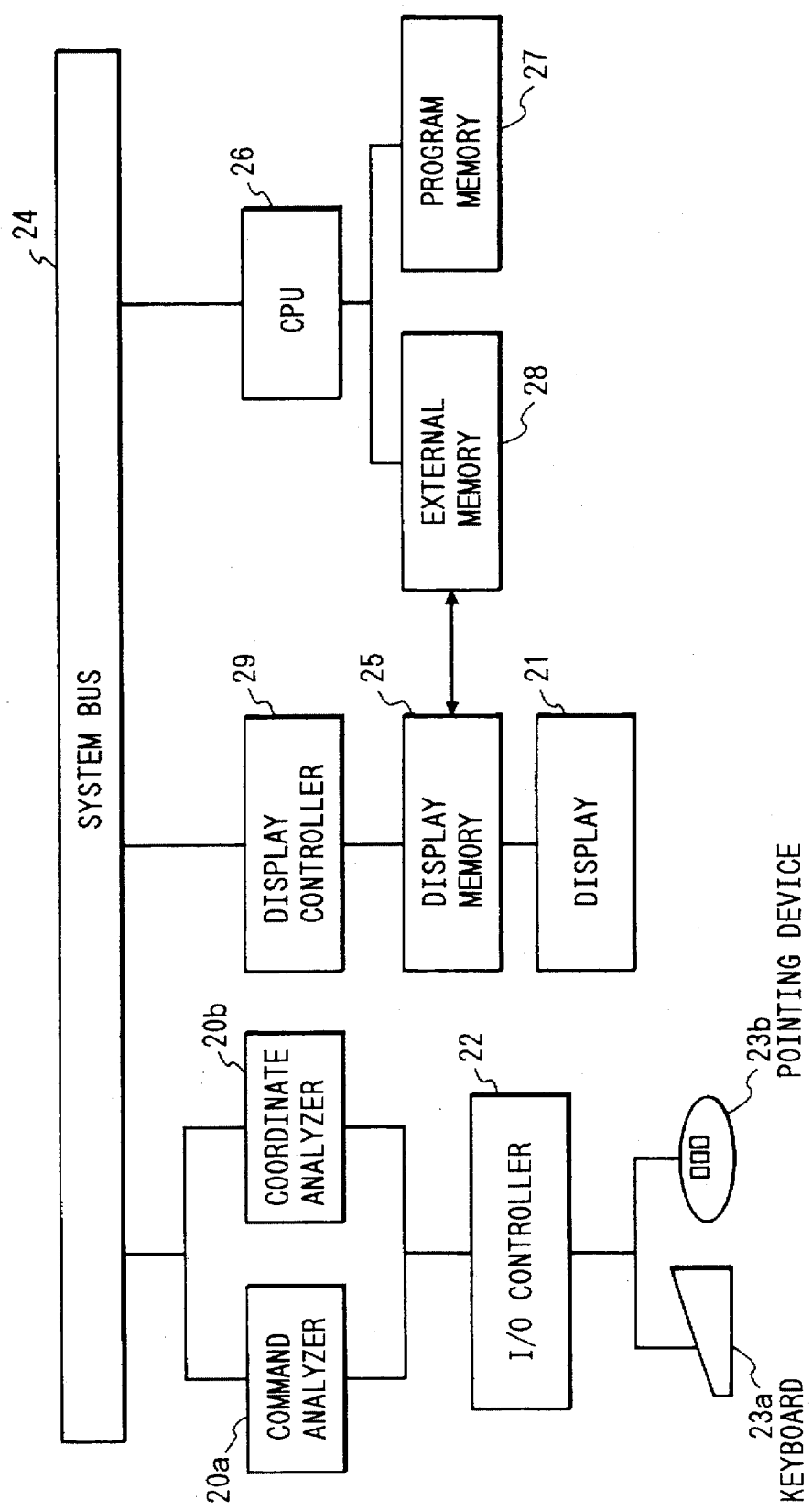

INFORMATION PROCESSING APPARATUS AND METHOD

This application is a continuation of application Ser. No. 08/354,465 filed Dec. 12, 1994, now abandoned.

BACKGROUND OF THE INVENTION

1. Field of the Invention

The present invention relates to an information processing apparatus having a personal computer, a DTP (desk top publishing), a CAD and other various graphic editing functions.

2. Related Background Art

In a graphics editing apparatus, when a view field of an object to be displayed, which cannot be entirely displayed on a display screen, is to be changed, an operator must enter a move direction and a distance by adding scroll bars along x axis and y axis of a two-dimension coordinate.

FIG. 5 shows a relation between edit data of a prior art graphics editing apparatus and a display screen. In FIG. 5, numeral 51 denotes edit data and numeral 52 denotes a display screen. The edit data 51 is displayed in a window 53. Since the window 53 cannot display the entire edit data 51, it displays partial data 54.

FIG. 6 shows the window 53 in detail. The partial data 54 is displayed in a display area 55. Numeral 56 denotes an x axis scroll bar and numeral 57 denotes a y axis scroll bar. The x or y axis scroll bar is pointed to by a mouse cursor, not shown, to move the image horizontally or vertically to move the data to be displayed on the display area 55. The black area on the x or y axis scroll bar indicates a rough position of the edit data 51.

In the above prior art, a problem exists in that the movement to a non-displayed area in the graphics editing apparatus cannot be rapidly attained. Namely, only a rough position is indicated and a long time is needed to locate a desired position.

In another known method, scrolling of the displayed data merely horizontally or vertically is directed, but the scrolling is conducted by a fixed amount and it is not possible to locate the desired data representation rapidly.

SUMMARY OF THE INVENTION

It is an object of the present invention to provide an information processing apparatus which enables rapid change of a display area and an improvement of a retrieval capability.

In order to achieve the above object, the information processing apparatus of the present invention includes a coordinate analyzer which analyzes input coordinate information, and marking means which marks a desired coordinate. A memory stores marking coordinate information analyzed by the coordinate analyzer and includes a mark name marked by the marking means. A display means displays the marking position in a display area based on marking information stored in the memory by designating the mark name when the marked coordinate is not present in the display area when changing the display area.

BRIEF DESCRIPTION OF THE DRAWINGS

FIG. 2 is a block diagram of the graphics edit apparatus of the present invention.

DETAILED DESCRIPTION OF THE PREFERRED EMBODIMENTS

Figure 4:
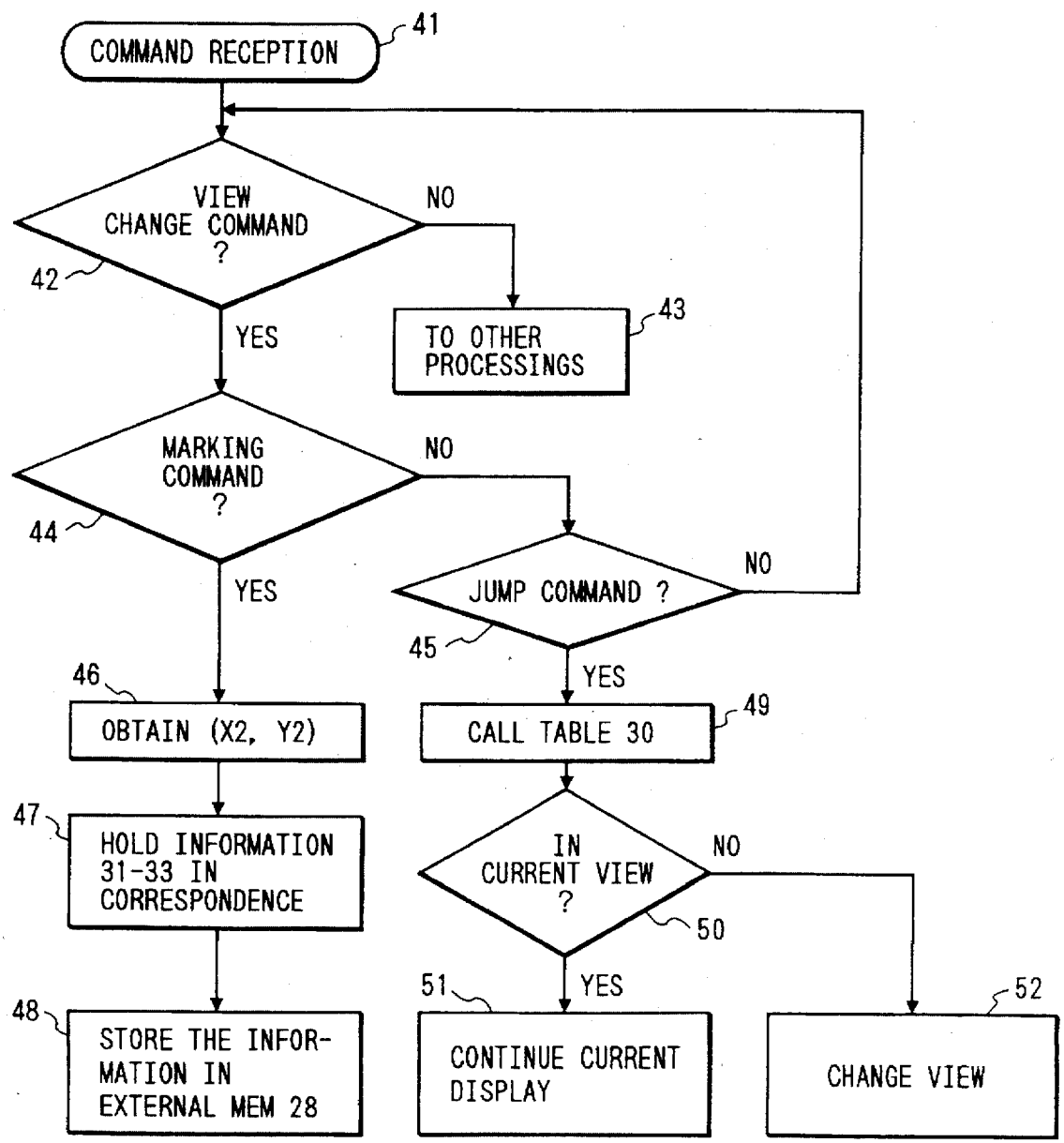
FIG. 4 is a flow chart illustrating the operation of the present apparatus.
Figure 3:
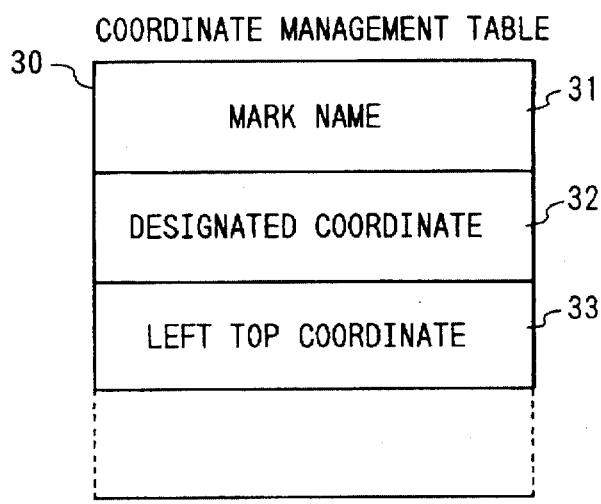
FIG. 3 is a coordinate management table in an external memory shown in FIG. 2.
Figure 5:
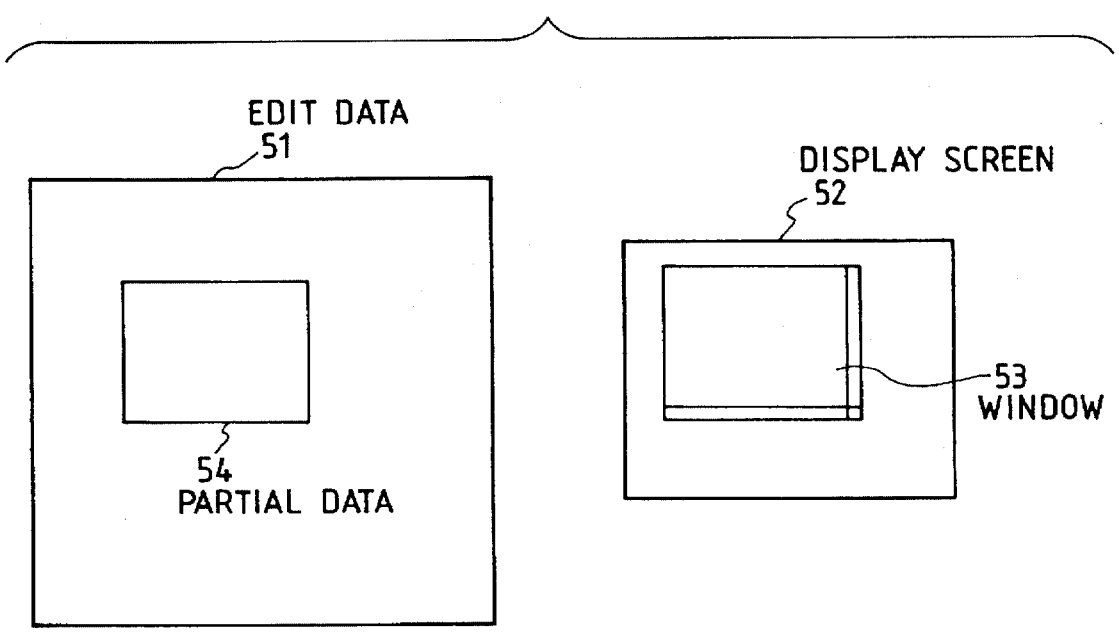
FIG. 5 shows a relation between a prior art edit data and a display screen.
Figure 6:
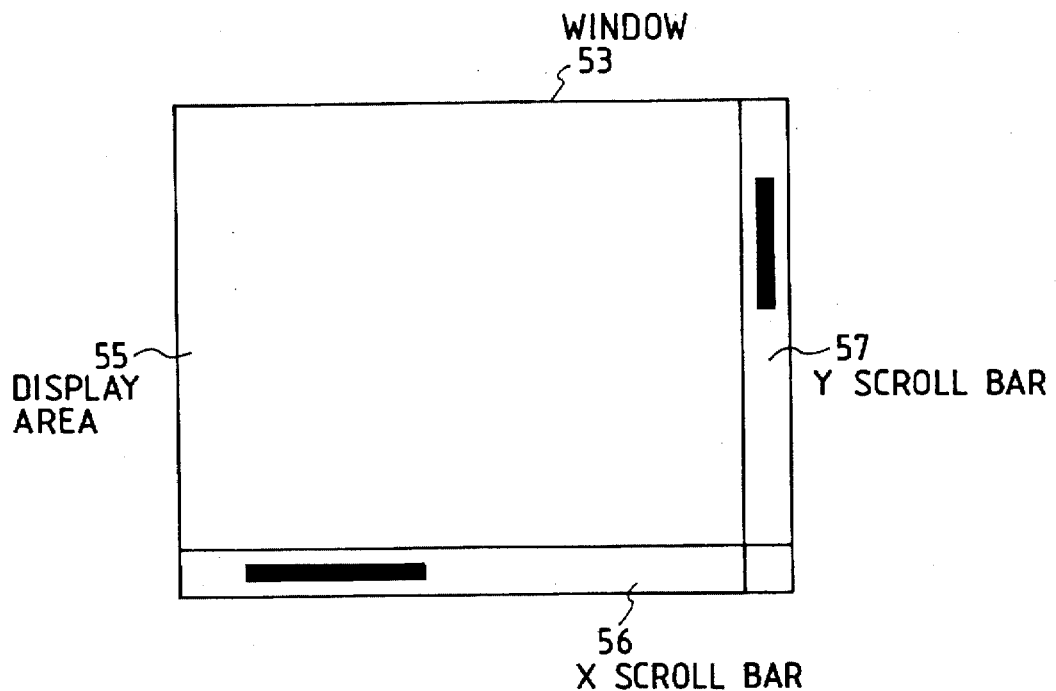
FIG. 6 shows a detail of the window in FIG. 5.

FIG. 2 is a block diagram of a graphics editing apparatus in accordance with the present invention. As an input device, a keyboard 23a and a pointing device 23b are provided. A command from the input device (23a, 23b) is sent via an I/O controller 22 to a command analyzer 20a and a coordinate analyzer 20b analyzed there, and thus analyzed data are transferred to a system bus 24. A central processing unit (CPU) 26 is connected to the system bus 24 and a coordinate management table 30, as shown in FIG. 3, is stored in an external memory 28 connected to the CPU 26. A program memory 27 stores a control procedure of the CPU 26 as shown in FIG. 4.

A display controller 29 is connected to the system bus 24, and the display controller 29 controls a display memory 25 to change the display content on the display 21.

FIG. 3 shows the structure of a coordinate management table 30 stored in the external memory 28. As shown, the coordinate management table 30 is constructed such that information 32 of a coordinate 13 (x1, y1) designated by the input device (23a, 23b) and information 33 of a left top coordinate 14 (x2, y2) of the display area (FIG. 1A) correspond to information 31 of mark name. By providing a sufficient memory area in the external memory 28, the coordinate table for a plurality of markings may be accommodated.

Figure 1A:
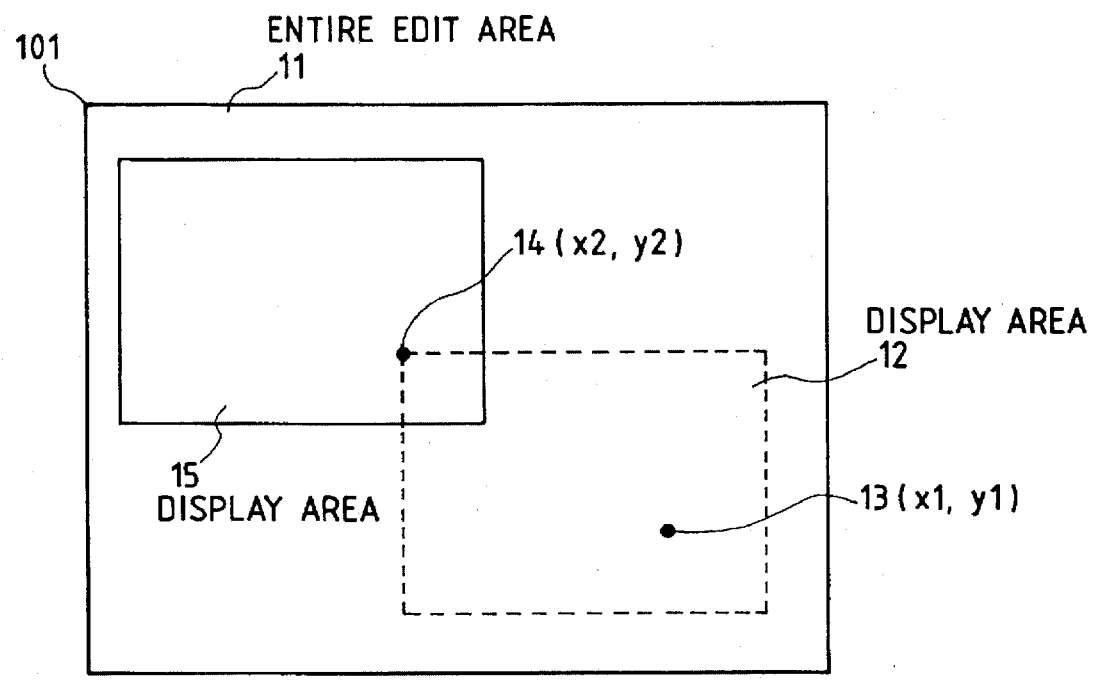
FIGS. 1A and 1B show display areas of a graphics edit apparatus in accordance with the present invention.
Figure 1B:
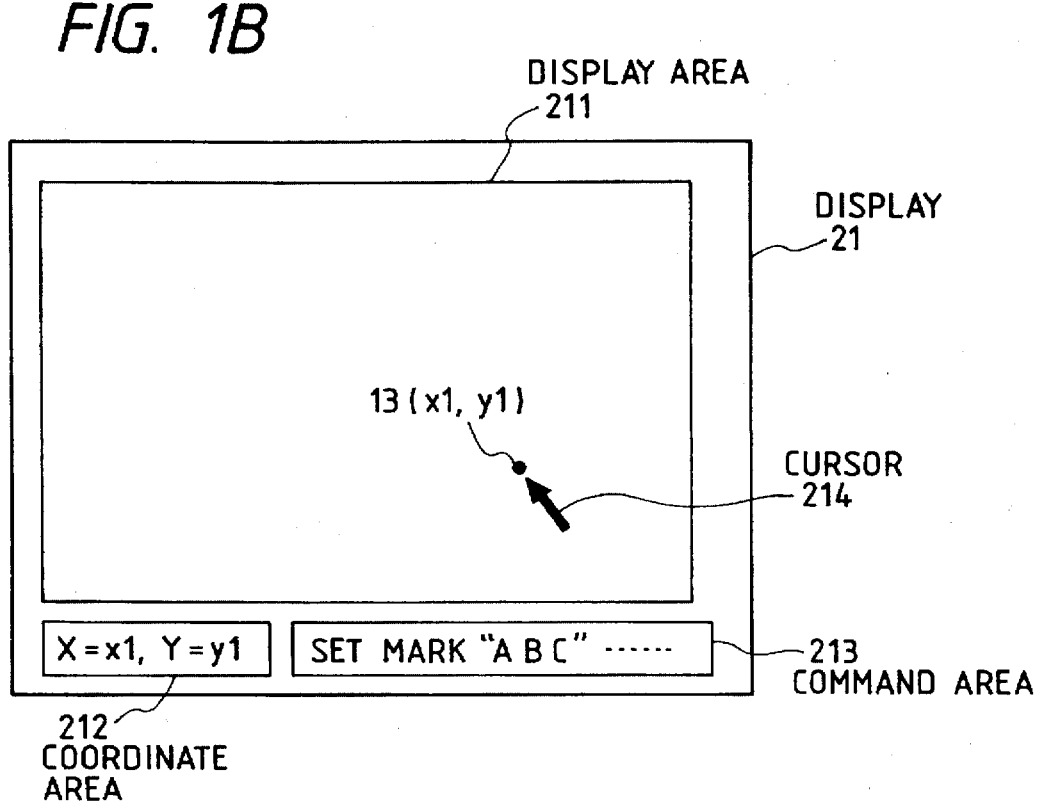

FIGS. 1A and 1B show a guide pattern for permitting rapid change of a view field in the present graphics editing apparatus. Specifically, FIGS. 1A and 1B show a relation between the display area on the display 21 and the edit area in accordance with the present invention.

Referring to FIGS. 1A and 1B and FIG. 4, the system operation is described.

While the entire edit area is subject to and edition, the display area 12 is displayed on the display area 211 of the display 21 because of the limited size of the display area 211.

A user names a desired coordinate 13 (x1, y1) through the input device 23 to mark it (step 41). For example, "SET MARK "abc" to POINT (x1, y1)" is entered from the keyboard 23a so that the coordinate 13 (x1, y1) is marked by the name "abc". The characters entered from the keyboard may be displayed at a command display area 213. In order to recognize the coordinate value, the mouse 23b is moved to move the mouse cursor 214 and the coordinate of the mouse cursor 214 is displayed at a coordinate display area 212. Thus, by moving the mouse cursor 214 to the vicinity of the coordinate to be designated, the coordinate value may be recognized.

When the command analyzer 20a indicates the marking process (steps 42 and 44), the coordinate analyzer 20b produces the left top coordinate 14 (x2, y2) of the display area 12 (step 46), and the information 32 of the designated coordinate and the information 33 of the left top coordinate are associated with the mark name information 31 and they are held in the coordinate management table 30 (step 47) and stored in the external memory 28 (step 48). The coordinate 14 (x2, y2) and the coordinate 13 (x1, y1) are associated to each other in order to attain the coordinate using the left top point 101 of the entire edit area 11 as an origin point because the coordinate of the mouse cursor 214 is displayed in the coordinate area 212 using the left top point of the display area 12 as the origin point.

In this manner, a plurality of coordinates may be registered.

It is assumed that various editings have been performed and the display area 15 is displayed in the display area 211. When the view field is to be changed to the designated position, a command "JUMP MARK "abc"" is entered from the keyboard 23a. The input command is analyzed by the command analyzer 20a (steps 44 and 45) and the coordinate management table 30 stored in the external memory 28 is called (step 49). In a decision step 50, if the coordinate 13 (x1, y1) is not present in the display area 15, the display area is changed so that the coordinate 13 (x1, y1) is centered in the display area (step 52) and the display content is transferred to the display memory 25 based on the coordinate information of the coordinate management table 30 stored in the external memory 28. The information is outputted to the display 21 through the display controller 29. In the decision step 50, if the coordinate 13 (x1, y1) is present in the current display area 15, the current display is continued (step 51).

The display process of the registered coordinate is now explained.

A command "DISP MARK" is entered from the keyboard 23a so that the registered coordinate is displayed in the display area 211 in the sequence of name (for example, "abc"), coordinate (for example, (x1, y1)) and registration date (for example, "10 Dec 94"). This may be conveniently used when the user forgets the registration name.

<Another Embodiment>

In the above embodiment, the coordinate is designated by the keyboard 23a. Alternatively, the coordinate may be designated by the pointing device 23b. The coordinate designated by the pointing device 23b is analyzed by the coordinate analyzer 20b and the marking may be made to the coordinate in the same manner as that of the previous embodiment.

In the above embodiment, the display area is changed so that the marked coordinate is centered in the display area. Alternatively, the display area may be changed so that the left top coordinate 14 (x2, y2) stored in the coordinate management table 30 is at the left top of the display area. By holding the two coordinates in the coordinate management table 30, they may be displayed upon request by the operator.

The retrieval of the plurality of markings may be conducted in the following manner. First, the retrieval may be made by displaying an icon of the marked coordinate. The icon of the marked coordinate is displayed in the window having the all edit areas 11 iconized, and the operator selects the icon to display it. Alternatively, the mark name designated by marking may be displayed in a menu form for retrieval, or the mark names may be listed in a table for retrieval. In this manner, the retrieval may be readily conducted even if there are a plurality of marked names.

Figure 7:
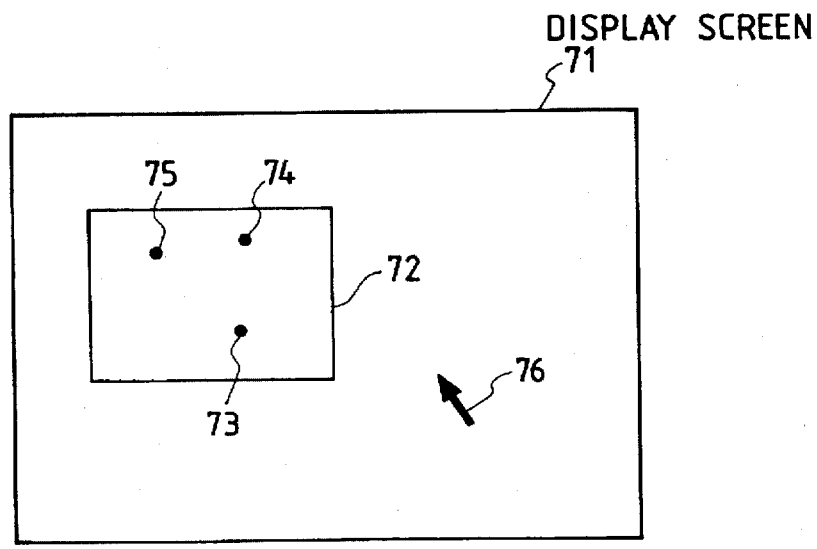
FIG. 7 shows a display screen in another embodiment of the present invention.

Referring to FIG. 7, the display screen 71 of the display 21 is shown. By designating the icon by the keyboard 23a, the screen shown in FIG. 7 appears. In FIG. 7, numeral 72 denotes an icon indicating the entire edit area 11. In the icon 72, icons 73 to 75 of a plurality of registered coordinates are shown, and the icon 73 represents the coordinate (x1, y1).

By pointing to one of the icons 73 to 75 by the mouse cursor 76, a desired position may be designated, and then the icon 72 is selected to display a desired area.

In accordance with the present invention, in graphics editing, the view field may be rapidly changed for the display area. In addition to the physical position of the two-dimension coordinate, the logical position may also be designated and the retrieval capability is improved.

What is claimed is:

1. An information processing apparatus comprising:

analysis means for analyzing input coordinate information to mark a coordinate point;

marking means for giving a mark name to the coordinate point marked by said analysis means;

memory means for storing marking information comprising the coordinate point marked by said analysis means and the mark name given by said marking means, the coordinate point and the mark name being in correspondence to each other;

input means for inputting a name;

search means for searching said memory means for the mark name coincident with the name input by said input means; and display control means for controlling a display device to replace information currently displayed on a display area of the display device by information at the marked coordinate point based on the marking information, stored in said memory means, corresponding to the mark name searched by said search means when the marked coordinate point is not present in the display area.

2. An apparatus according to claim 1, wherein the marked coordinate point comprises X and Y coordinate data.

3. An apparatus according to claim 2, wherein said memory means stores the marked coordinate point and the mark name in correspondence to each other in response to the marked coordinate point and the mark name being simultaneously input.

4. An apparatus according to claim 1, wherein said memory means stores a plurality of the marked coordinate points and a plurality of the mark names in correspondence to each other.

5. An apparatus according to claim 4, wherein said display control means controls the display device to display the plurality of mark names stored in said memory means such that a desired one of the mark names can be designated.

6. An information processing apparatus comprising:

display control means for controlling a display device to display data;

registration means for registering in a memory means a desired position of the displayed data and a name in correspondence to each other;

input means for inputting a name;

search means for searching said memory means for the name registered by said registration means coincident with the name input by said input means; and display updating means, responsive to the name being input, for displaying data for the position corresponding to the name searched by said search means on the display device instead of data currently displayed on the display device.

7. An information processing apparatus according to claim 6 wherein said display updating means displays the data such that the position corresponding to the input name is present at the center of a display area of the display device.

8. An apparatus according to claim 6, wherein the registered position comprises X and Y coordinate data.

9. An apparatus according to claim 8, wherein said registration means registers the position and the name in correspondence to each other in response to the position and the name being simultaneously input.

10. An apparatus according to claim 6, wherein said registration means registers a plurality of the points and a plurality of the names in correspondence to each other.

11. An apparatus according to claim 10, wherein said display control means controls the display device to display the plurality of names registered in said registration means such that a desired one of the names can be designated.

12. An information processing method comprising the steps of:

displaying data on a display screen;

registering in a memory a desired position of the displayed data and a name in correspondence to each other;

inputting a name;

searching the memory for the name registered in said registering step coincident with the name input in said inputting step; and in response to the name being input, displaying data for the position corresponding to the name searched in said searching step on the display screen instead of data currently displayed on the display screen.

13. A method according to claim 12, wherein the registered position comprises X and Y coordinate data.

14. A method according to claim 13, wherein said registering step registers the position and the name in correspondence to each other in response to the position and the name being simultaneously input.

15. A method according to claim 12, wherein said registering step registers a plurality of the points and a plurality of the names in correspondence to each other.

16. An apparatus according to claim 15, wherein said displaying step displays the plurality of names registered in said registering step such that a desired one of the names can be designated.

* * * * *

UNITED STATES PATENT AND TRADEMARK OFFICE
CERTIFICATE OF CORRECTION

PATENT NO. : 5,673,067

DATED : September 30, 1997

INVENTOR(S) : YASUYUKI OGAWA ET AL.

It is certified that error appears in the above-identified patent and that said Letters Patent is hereby corrected as shown below:

COLUMN 2

Line 19, "analyzed there," should read --to be analyzed,--
     and "thus" should read --the thus--.
   Line 46, "and edition," should read --editing,--.

COLUMN 3

Line 61, "are" should read --is--.

COLUMN 4

Line 65, "claim 6" should read --claim 6,--.

COLUMN 6

Line 16, "apparatus" should read --method--.

Signed and Sealed this

Fourteenth Day of April, 1998

*Attest:*

BRUCE LEHMAN

*Attesting Officer*    *Commissioner of Patents and Trademarks*